United States Patent Office 2,971,307
Patented Feb. 14, 1961

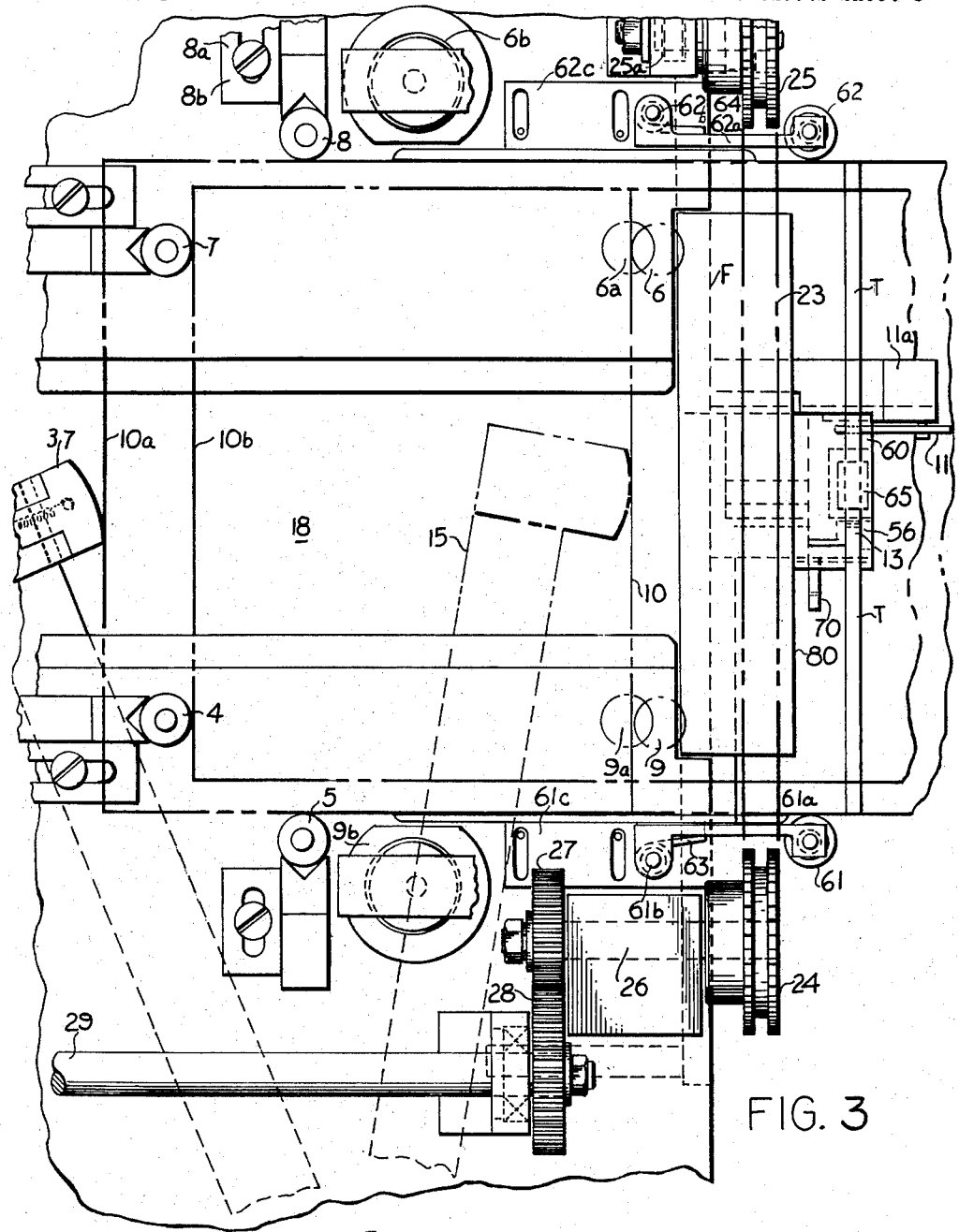
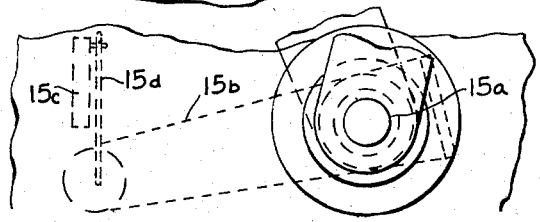
FIG. 3
INVENTORS
THEODORE F. ARONSON
FLOYD A. LYON

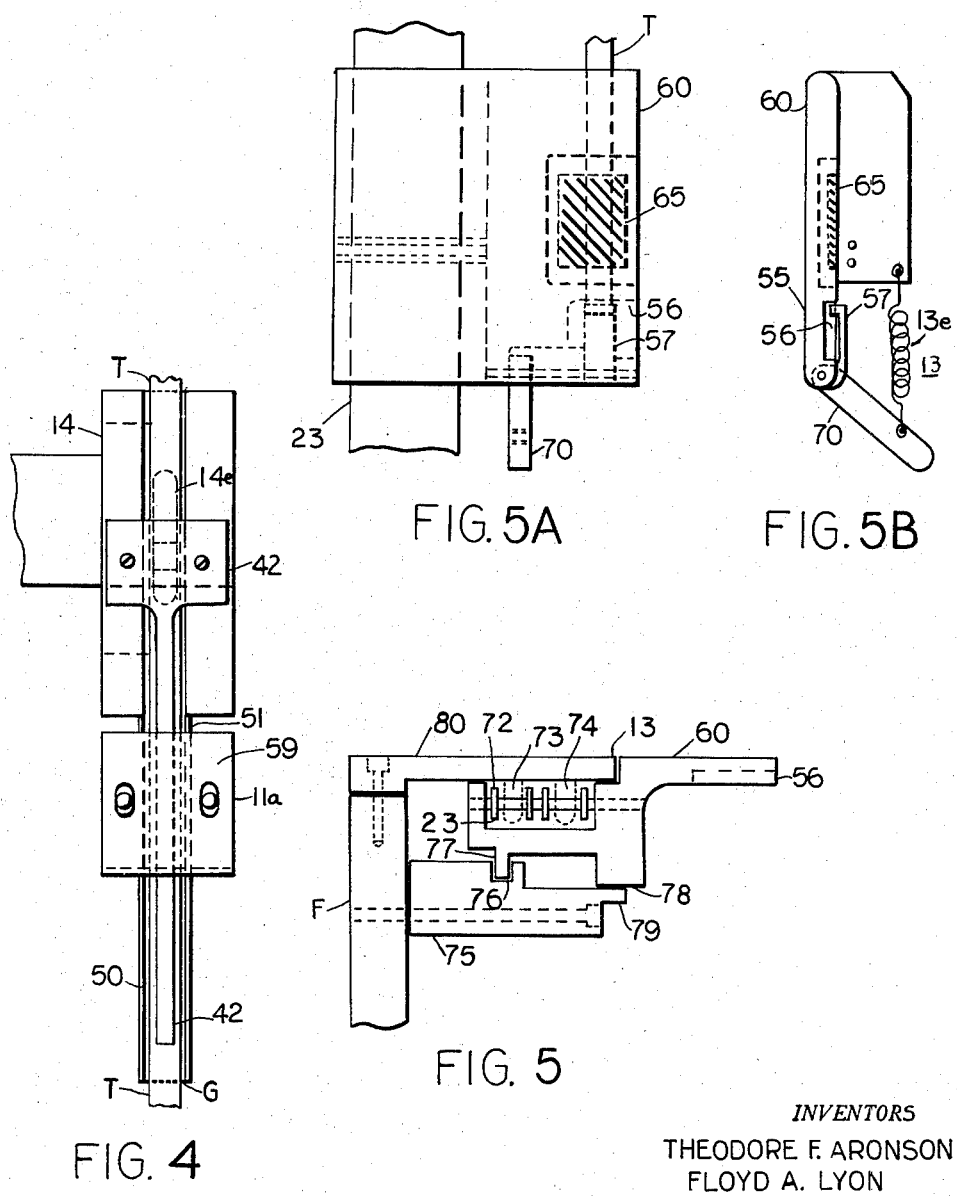

2,971,307
ARTICLE BANDING MEANS
Floyd A. Lyon, Old Wheatley Road, Brookville, N.Y., and Theodore F. Aronson, 60 Crescent Beach Road, Glen Cove, N.Y.

Filed Sept. 25, 1958, Ser. No. 763,411

4 Claims. (Cl. 53—198)

This invention relates to article banding means and more particularly to means for applying tape around articles such as boxes or the like.

The present invention provides high speed automatic means for securely fastening tape such as cellophane tape around one or more articles such as boxes. The articles or boxes are fed from a stack to a work location where they are clamped in place. The tape is fed from a roll through a pivotally mounted feeder. The end of the tape is received by a clamp which is attached to a driven chain which carries the clamp and the tape around the box until there is a small overlapping of the tape. The traveling clamp then stops and a heating iron is applied to the overlapping portion of the tape to heat seal the portions together and the tape is then severed with a knife leaving a belt around the articles or boxes. The articles or boxes are then ejected onto a conveyor or other delivery means and a new cycle is started. All of the operations are cam controlled in a predetermined sequence by cams mounted on a common cam shaft.

The heat sealing feature eliminates the use of staples or adhesives which are difficult to feed automatically. Means are provided for squeezing the box during the wrap-around period so that when the box is released it takes up any slack in the tape loop.

One of the problems in apparatus of this type is breakage of the tape, and means are provided including a motor drive for the tape roll and slack takeup means for eliminating excessive pull on the tape. Novel tape feeding means are provided including a pivotally mounted arm with a pawl gripper. The present apparatus has successfully handled cellophane tape of approximately .003 inch in thickness.

Accordingly, a principal object of the invention is to provide new and improved article feeding and banding means.

Another object of the invention is to provide new and improved article banding means.

Another object of the invention is to provide new and improved high speed box banding means.

Another object of the invention is to provide new and improved high speed means for wrapping tape around one or more articles or boxes and heat sealing said tape in a tight loop around said articles or boxes.

Another object of the invention is to provide new and improved means for feeding articles or boxes from a stack to a work location, means for wrapping tape around said articles or boxes, means for heat sealing said tape around said articles or boxes, and means for controlling all of said operations in a predetermined sequence.

These and other objects of the invention will become apparent from the following specification and drawings, of which:

Figure 3 is a partial top view of the embodiment of Figure 1.

Figure 4 is a detailed enlarged top view of the tape feeder arm.

Figures 5, 5A, and 5B are detail views of the clamp means, and

Figure 6:
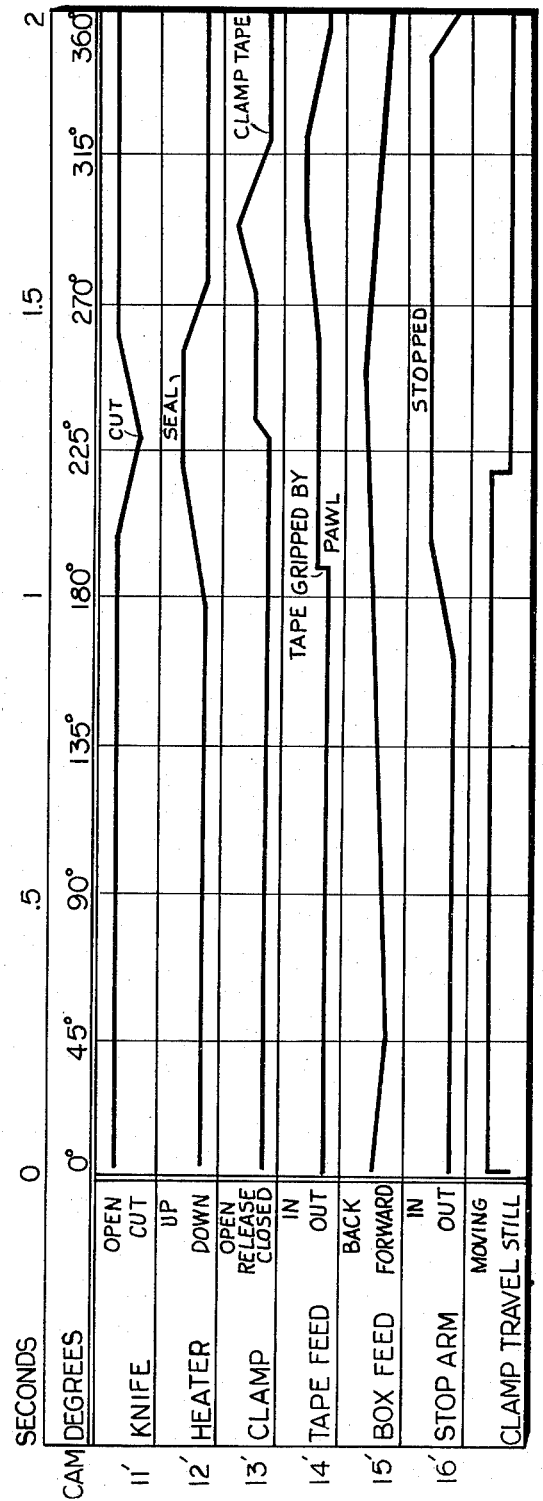

Figure 6 is a cam development and timing diagram.

Figure 1:
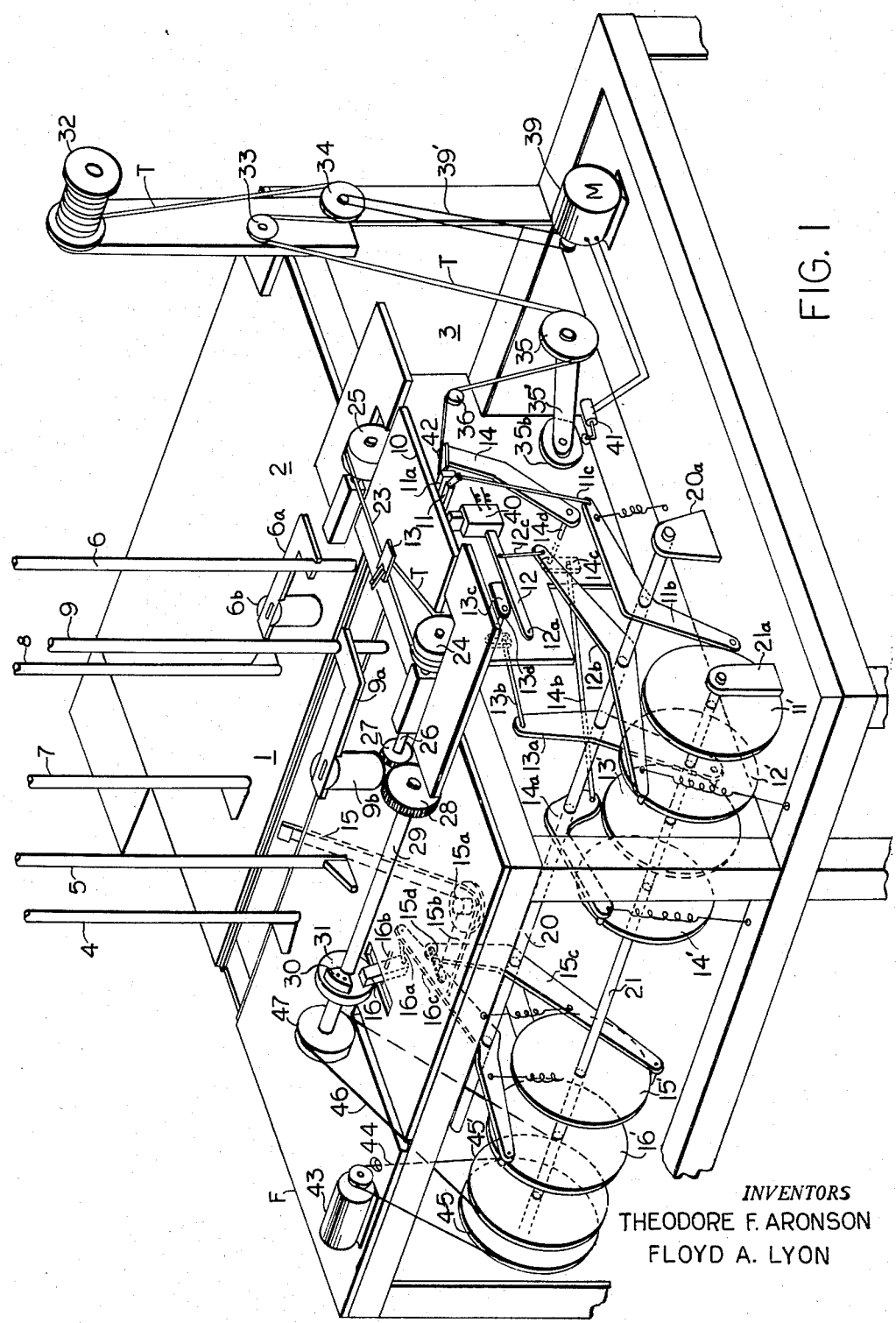
Figure 1 is a perspective view of an embodiment of the invention.

Figure 1 shows a perspective view of an embodiment of the invention generally comprising a main frame F which supports a rack 1, a work location 2, and tape feeding means 3.

The rack 1 comprises a series of upright rods 4 to 9 inclusive mounted on the frame preferably in an adjustable manner to accommodate different size boxes. The lowest box is pushed from the bottom of the stack under the forward rods into the work position, as shown by the box 10, by means of the arm 15 which is pivotally mounted to the frame on shaft 15a and extends through a slot or aperture in the table frame and which is connected to be actuated by the cam 15' by means of the linkage comprising the member 15b which is connected to the rocker arm 15c by member 15d, the other end of rocker arm 15c riding on the cam 15'. The rocker arm 15c is mounted on a common rocker arm shaft 20 which is mounted to the frame, and the cam 15' is mounted on a common cam shaft 21 which is rotatably mounted on the frame.

The tape T is wrapped around the box 10 by means of the traveling clamp 13 which is mounted on a chain 23 which is connected to the two sprockets 24 and 25 journalled to the frame. The sprocket 24 is driven by shaft 26 which is connected by the gears 27 and 28 and shaft 29 which is motor driven. A positioning stop 30 for the clamp drive is mounted on the disc 31 which is fixedly connected to the shaft 29. The stop 30 is adapted to be released by the stop arm 16 which is actuated by the cam 16' by means of the linkage comprising pivotally mounted arm 16a journalled to the table, connecting link 16b and rocker arm 16c which is mounted on the rocker arm shaft 20 and the other end of which rides on the cam 16' mounted on the common cam shaft.

The stop 30 is set to stop the clamp 13 in a position underneath the box 10 where it will receive the end of the tape from the tape feeder arm 14. The tape T is fed from the roller 32 around the rollers 33 and 34 and roller 35 on pivotally mounted tension arm 35' thence over roller 36 mounted on the frame and to the tape feeding arm 14.

The arm 14 is adapted to be actuated by the cam 14' by means of the linkage comprising rocker arm 14a which rides on the cam, connecting member 14b, which is pivotally connected at its other end to connecting member 14c which is fixedly connected to the arm 14. The rod 14d is journalled to the frame.

The cam operated heating iron 40 is mounted to heat seal the cellophane tape after it has been wrapped around the box. The heating iron 40 is mounted on an arm 12 which is pivotally mounted to the main frame at the point 12a. It is connected to be actuated by the cam 12' by means of the linkage comprising the rocker arm 12b and a connecting link 12c which is pivotally connected at its ends to the rocker arm 12b and the arm 12. The heater 40 element may be the cartridge type of the kind employed in soldering irons. The 150 watt size has been found satisfactory.

A knife is connected to sever the tape after the heat sealing. It comprises a rotatable blade 11 which is pivotally mounted on the block 11a on the frame and which is connected to be actuated by the cam 11' by means of the linkage comprising the rocker arm 11b which rides on the cam and which is connected to the blade 11 by means of the connecting rod 11c.

The clamp 13 is normally spring closed by a spring 13e, Figure 5B, but is adapted to be opened by means of the arm 13c moving arm 70 connected to clamp jaw 57 which is operated by the cam 13' and connecting linkage comprising a rocker arm 13a and connecting member 13b connecting the rocker arm to the frame mounted shaft 13d which is fixedly connected at its other end to the arm 13c.

The motor 39 is operated by the slack control arm 35' which operates the switch 41 which controls the motor 39. When the arm 35' rises due to tension on the tape, the cam 35b on the arm energizes the switch 41 to operate the motor 39 until there is sufficient slack under the roller 35 to drop the arm 35'.

Power is provided by motor 43 via belt 44 to pulley 45 on camshaft 21, and via pulley 45' to clutch 47, the output of which is connected to shaft 29. When the stop 30 is engaged by arm 16, the clutch 47 slips.

Figure 2:
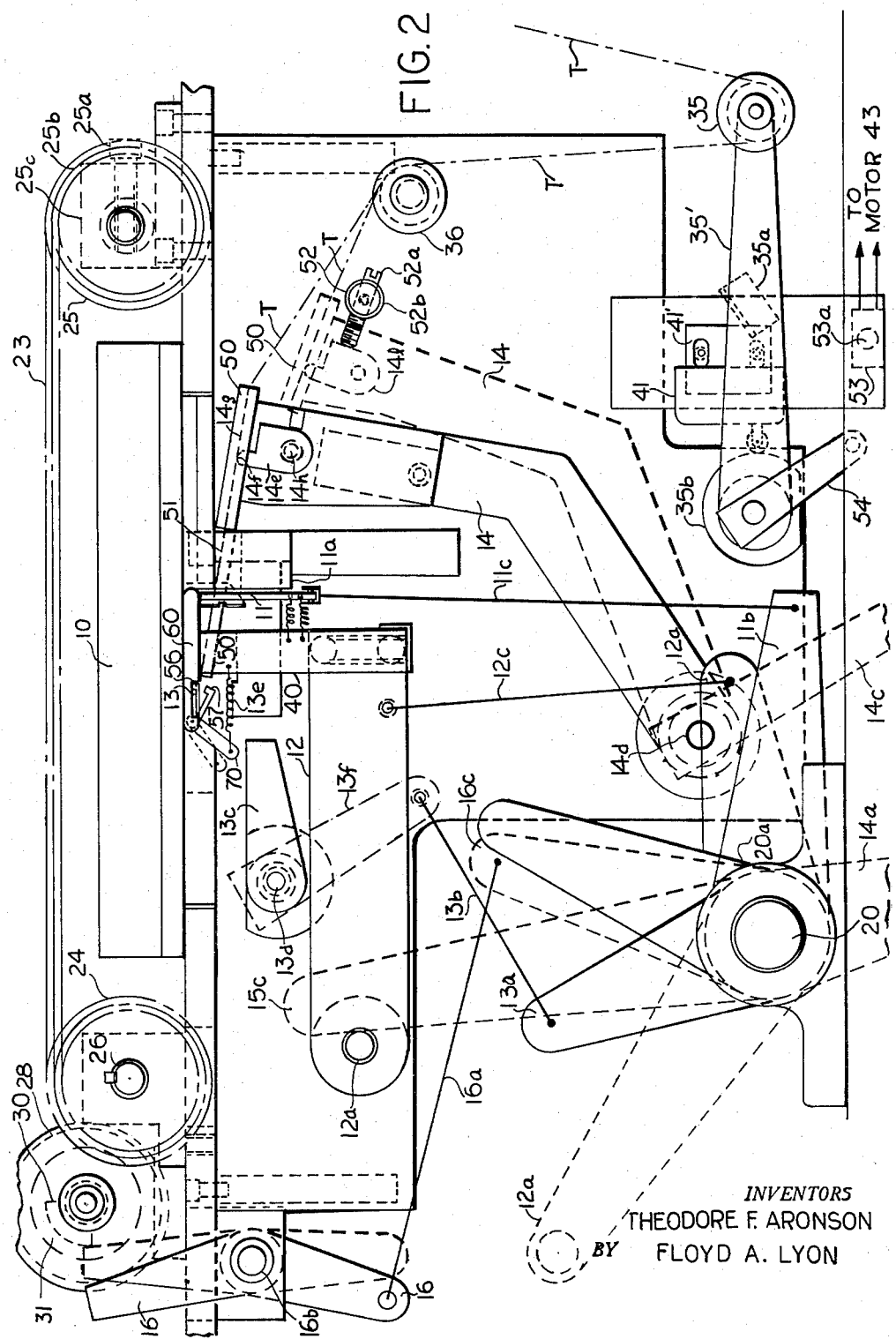
Figure 2 is a partial side view of the embodiment of Figure 1.

Figure 2 shows a detail side view of the embodiment of Figure 1. The chain 23 rides on sprockets 24 and 25 which are mounted on bearing blocks connected to the frame F. The sprocket 25 has adjustable means for tightening the chain comprising an adjustment screw 25a which is adapted to move the shaft 25b within a slot in the mounting block 25c. The clamp 13 is fixed to the chain 23, as will be described, and is shown in position to receive the end of the tape from the tape feeder 14 which is pivotally mounted on shaft 14d journalled to the frame.

The tape feeder 14 has a long extension 50 at right angles to the top of the arm in which the tape is held by a spring, as will be shown in further detail in Figure 4. The extension 50 fits through a slot 51 in the block 11a attached to the frame and to which the knife 11 is pivotally mounted. The tape feeder arm 14 is retracted to the position shown in the dotted lines when the knife 11 is operated. The arm 14 motion is equal to the distance from knife 11 to clamp 13 in loading position. The tape feeder arm 14 does not pull the tape T against any force since slack is provided by the motor 39 which drives the tape supply roll.

The tape is clamped in the arm 14 by means of the wedging action of the pawl 14e which is pivotally mounted on the arm. The upper end 14f of the pawl squeezes the tape against the surface 14g. The pivot point 14h is displaced from the contact point so that when the arm 14 is moved up, the pawl 14e grips the tape with a wedging action. However, when the arm 14 is rotated down, the pawl 14e does not grip the tape so that the tape can slip. The adjustable stop 52 further opens the pawl 14e in a positive manner when the arm 14 is in the position shown in the dotted lines. This permits the tape to ride freely during the travel time of the clamp. Also, since the clamp travel around the sprockets is greater than the length of tape required to band the box, some tape must be retracted each cycle. This is done by the weighted arm 35' pulling the tape back through the opened pawl 14e. The stop 52 comprises a screw 52a in a threaded stud 52b mounted on the frame.

However, just before the tape is severed, it is necessary that the pawl 14e again grip the tape so that the free end will not slide out of the arm 14. This is done by moving the arm 14 up slightly before the tape is cut. This movement is shown at approximately 190° on the diagram of Figure 6 showing the developed shape of the tape feed cam.

If the tape should break, the arm 35' drops down and the projection 35a operates the projecting arm 53a of switch 53 which thereupon turns off the main motor 43 stopping the machine. The arm 54 is a lower stop for the arm 35' to prevent the arm 35' from falling any further than necessary.

The chain 23 is driven in predetermined synchronism with the camshaft 21, Figure 1, by means of sprocket 24 which is connected by shaft 26, gears 27 and 28 to the clutch driven shaft 29.

Cams 11' to 16' inclusive are mounted on the common camshaft 21 which is mounted in the bearing 21a connected to the frame. All the associated rocker arms are mounted on the common rocker arm shaft 20 which is mounted in the bearing block 20a connected to the frame.

The knife 11 is pivotally mounted on the block 11a connected to the frame which has a slot 51 therein through which the tape feeder extension member 50 is inserted to feed the end of the tape to the clamp 13. The knife 11 is pivotally connected to the connecting rod 11c which is pivotally connected at its other end to the rocker arm 11b mounted on the shaft 20. The other end of the rocker arm 11b has a cam follower spring loaded against the cam 11'. The blade 11 shears the tape with a scissor action against a stationary cutting edge 59, Figure 4, mounted on blade 11a.

The heater iron 40 is mounted on the arm 12 which is pivotally mounted on the shaft 12a journalled to the frame. The arm 12 is operably connected to the connecting rod 12c which is connected at its other end to the rocker arm 12a mounted on the rocker arm shaft 20. The other end of the rocker arm 12a has a cam follower which is spring loaded against the cam 12'.

Clamp 13, see also Figure 5, comprises a plate member 60 which is inserted in the chain 23 by substituting it for a link of the chain and connecting the plate to the chain with pins. The plate has a recess 56 for receiving the end of the tape. The tape is then clamped in the recess by the arm 57 which is pivotally mounted on the plate 60. An angled extension 70 of the arm 57 is spring loaded in closed position by the spring 13e. The clamp is adapted to be opened by means of the arm 13c and is connected at its other end by means of the connecting rod 13b to the rocker arm 13a mounted on the rocker arm shaft 20. The other end of the rocker arm 13a has a cam follower which is spring loaded against the cam 13'.

The tape feeder arm 14 is pivotally mounted on the shaft 14d journalled to the frame. Extension arm 14c is fixedly connected to the shaft 14d and to the arm 14 and pivotally connected at its other end to connecting rod 14b which is pivotally connected at its other end to the rocker arm 14a mounted on the rocker arm shaft 20. The other end of the rocker arm 14a has a cam follower which is spring loaded against the cam 14'.

The stop arm 16 initiates the cycle by releasing the stop 30 on the disc 31 mounted on the power shaft 29. The stop control arm 16 is pivotally mounted on the shaft 16b which is journalled to the frame. The other end of the arm 16 is pivotally connected by means of connecting rod 16a to the rocker arm 16c mounted on the rocker arm shaft 20. The other end of the rocker arm 16c has a cam follower which is spring loaded against the cam 16'.

Figure 3 shows a top view of the embodiment of Figures 1 and 2. The boxes are stacked in the rack formed by the rods 4 through 9 inclusive. The rods are mounted on slotted brackets like bracket 8a which is adjustably connected to the table frame by means of clamping screw 8b, so that different size boxes may be accommodated. The forward rods 6 and 9 are mounted on right angle brackets 6a and 9a which are slotted and which are adjustably connected to the posts 6b and 9b, Figure 1, by means of screws through the slots. The posts 6b and 9b are preferably of the telescoping type so that they are also adjustable vertically.

The bottom box is pushed by means of the arm 15 under the rods 6 and 9 into the work location as shown by the box 10. The arm 15 has a pivotally mounted pawl tip 37, which is spring loaded by spring 38, to engage the edge of the lowest box. Different size boxes 10a and 10b are illustrated. The box is held tightly in position on shelf 80 by means of the side rollers 61 and 62 which are mounted on the arms 61a and 62a which are pivotally mounted on the shafts 61b and 62b. The shafts are journalled to the adjustably slotted brackets 61c and 62c which are fastened to the frame with suitable screws mounted in the slots. The rollers are spring loaded against the sides of the boxes by means of springs 63 and 64 which are strong enough to hold the boxes tightly and actually push in the sides of the boxes during the wrapping around of the tape. Therefore, when the box is released from the rollers after being taped, it will expand slightly and make the tape taut. This feature compensates for any slack introduced by the fact that the clamp plate is between the box and the tape.

The box moving arm 15 is pivotally mounted on the shaft 15a which is journalled to the under side of the table frame. The end of the arm 15 has an upward projecting pawl 37 which extends through the large slot or aperture 18 in the table frame. The arm 15 is operated by means of the arm 15b which is fixedly connected to shaft 15a and arm 15b and which is connected at its other end to connecting rod 15d which is pivotally connected at its other end to the rocker arm 15c mounted on the rocker arm shaft 20. The other end of the rocker arm 15c has a cam follower which is spring loaded against the cam 15'.

The chain 23 is mounted on the sprockets 24 and 25, the sprocket 25 having an adjustment screw 25a for adjusting the tightness of the chain. The sprocket 24 is driven by means of the shaft 26 and gears 27 and 28 which connect the shaft 26 to the clutch driven shaft 29. The shaft 29 is driven by means of a chain drive, as shown in Figure 1, through a clutch. The stop 30 is also mounted on the shaft 29.

The clamp 13 is mounted on a plate 60 containing a cut-out portion 56. The plate 60 is connected to the chain by removing a link of the chain and inserting the plate with chain pin connectors. The plate 60 contains a rubber insert 65, for instance, of soft, heat resistant rubber, against which the heater iron seals the tape together. The use of the rubber insert is important as it prevents loss of heat since it is an insulator and also due to the fact that it is elastic so that maximum contact is obtained between the heater iron and the tape.

One of the problems in devices of this kind is controlling the tension on the tape so that it will not break. The tension is regulated by a pivotally mounted tension arm 35', Figures 1 and 2, the weight of which is chosen to maintain a predetermined tension on the end of the tape. The leading end of the tape is never loose so as to be pulled out of the arm 14 by arm 35', being held by the pawl 14e. The tape pulley 34 is motor driven by the motor 39 via belt 39' to provide a slack loop under the tension control arm 35'. The tension control arm has a projection 35a adapted to actuate a switch 41 which controls the motor 39. In other words, when the arm 35 rises due to tension, cam 35b actuates the arm 41' of the switch 41 which turns on the motor 39 which provides more slack under the roller 35. The arm 35' will then fall and turn off the switch 41. Separate on and off switches may be provided if desired.

Figures 5, 5A, and 5B show front, top and side views of the clamp member 13 which comprises a plate member 60 having an extending portion and having a recess 56 into which the tape is inserted and in which the tape is clamped by means of the pivotally mounted arm 57. The clamp member 13 is inserted in the chain, the cut-out portion 72 being provided to permit clearance around the sprockets indicated at 73 and 74. The extending portion also contains a soft rubber plate 65 against which the heater iron bears. The rubber plate provides heat insulation and a flexible surface for good contact between the heater and the tape and maximum heat transfer.

The clamp plate 60 is supported at the work location by the lower gib 75, Figure 5, which is bolted to the frame F. It contains a groove 76 which supports the corresponding projection 77 of the clamp plate 60. The bottom surface 78 of plate 60 is also supported by the corresponding projection 79 of the lower gib 75. The groove 76 is preferably flared at one end where the projection 77 enters it.

The traveling plate 60 is prevented from moving upward due to pressure of the heater 40 by means of the platform 80 which is bolted to the main frame. Any upper motion is prevented by contact between the bottom surface of the plate 80 and the corresponding contacting upper surfaces of the traveling plate 60. Platform 80 also serves as a shelf for the boxes.

Figure 4 shows a top enlarged view of the tape feeding arm 14. The long extension 50 of arm 14 is shown extending through slot 51 in block 11a which supports the knife 11. The adjustable stationary knife blade 59 is mounted on top of block 11a. The tape T extends through a long groove G and is held therein by the long leaf spring 42.

*Operation*

All of the mechanisms above described are synchronized and controlled in a predetermined sequence by means of the cams mounted on the motor driven camshaft. The sequence of operation is plotted by the cam development diagrams of Figure 6. Each diagram is the developed periphery of the respective cam.

To start the cycle the stop 30 is released by the arm 16 connected to cam 16', and the tape is pulled around the box by the clamp 13 riding on the chain 23. After one revolution the chain is stopped (210°) by stop 30 hitting arm 16, the stop arm having moved into position.

The heating iron 40 is then actuated by the cam 13' to heat seal the tape loop (220°–250°) and the knife 11 is actuated by the cam 11' to cut the tape (230°). The clamp 13 is then released by the cam 13' and connected linkage.

The box is now ready to be ejected which is done by means of the arm 15 actuated by cam 15' moving a new box forward into the work location starting at about 250°. The new box pushes out the tape sealed box onto a conveyor or other takeaway means which are not shown. The tape feed cam 14' has moved arm 14 (190°) so that the tape is gripped by pawl 14e before the tape end is severed. The tape feeder arm is then rotated by the cam 14' and associated linkage to place the end of the tape into the clamp 13. The clamp grips the tape (320°) as the clamp arm 13c is released. The tape feeder arm 14 is retracted out of the way of the knife during the cutting. The stop 30 is then released by the arm 16 and a new cycle is started.

The invention is not limited to banding boxes but may be used for a variety of articles.

We claim:

1. In means for banding boxes with tape of the type comprising a main frame, means to squeeze a box at said work location; a tape feeder arm pivotally mounted on said main frame and adapted to feed tape to said work location, tape clamping means at said work location, a continuous chain drive connected to said tape clamping means, including an adjustable stop connected to said chain drive sprocket, said stop being adjustably mounted on a clutch driven disc geared to said chain, a cam operated stop arm adapted to contact said stop, means to furnish a constant tension supply of tape to said arm including a locking pawl, and adjustable means to open said locking pawl during travel of said tape clamping means.

2. Means for banding boxes with tape comprising a main frame, means mounted on said main frame and adapted to guide a box to a work location, tape feeder and retracting means mounted on said main frame and adapted to feed tape to said work location, said tape feeder means comprising a tape roll mounted on said frame, an excess tape retracting arm mounted on said frame, motor means connected to drive said roll, and means connected to said arm and said motor means to control the feeding of said tape, tape clamping means connected to receive said tape at said work location, and a continuous chain drive connected to said tape clamping means.

3. In a machine for banding articles with tape of the type comprising a main frame, tape clamping means at a work location, and a continuous chain drive connected to said tape clamping means; a tape feeder arm pivotally mounted on said main frame and adapted to feed tape to said work location, a tap locking pawl on said feeder arm, means to furnish a constant tension supply of tape to said arm, means to open said locking pawl during a portion of the cycle of operation, means to retract excess tape after travel of said clamp, and means to lock said pawl to grip said tape after retraction thereof whereby said tape may be severed without pulling out of said feeder arm.

4. Tape feeding means comprising a tape spool, a pivotally mounted weighted excess tape retracting arm adapted to receive a loop of tape from said spool, a pivotally mounted tape feeding arm located to receive tape from said retracting arm, a locking pawl mounted on said tape feeding arm, said locking pawl being eccentrically mounted to grip said tape on forward motion of said feeder arm, means to release said pawl during a certain portion of the cycle whereby excess tape may be retracted by said retracting arm, and means to actuate said feeder arm forwardly immediately thereafter whereby said locking pawl will grip said tape thereby permitting said tape to be severed without sliding out of said feeder arm.

References Cited in the file of this patent

UNITED STATES PATENTS

| | | |
|---|---|---|
| 1,964,070 | Mertis | June 26, 1934 |
| 2,078,282 | Sadgebury | Apr. 27, 1937 |
| 2,605,101 | Lessmann | July 29, 1952 |
| 2,688,830 | Halahan et al. | Sept. 14, 1954 |
| 2,768,489 | Brown et al. | Oct. 30, 1956 |
| 2,846,010 | Wheeler | Aug. 5, 1958 |